(12) United States Patent
Muldoon et al.

(10) Patent No.: US 11,585,291 B2
(45) Date of Patent: Feb. 21, 2023

(54) TAIL CONE EJECTOR FOR POWER CABLE COOLING SYSTEM IN A GAS TURBINE ENGINE

(71) Applicant: RAYTHEON TECHNOLOGIES CORPORATION, Farmington, CT (US)

(72) Inventors: Marc J. Muldoon, East Hartford, CT (US); Jonathan Rheaume, East Hartford, CT (US); Stephen H. Taylor, East Hartford, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 17/018,795

(22) Filed: Sep. 11, 2020

(65) Prior Publication Data

US 2022/0082052 A1 Mar. 17, 2022

(51) Int. Cl.
| | |
|---|---|
| *F02K 1/36* | (2006.01) |
| *F02C 7/18* | (2006.01) |
| *F02K 1/38* | (2006.01) |
| *F01D 15/10* | (2006.01) |
| *F02C 7/32* | (2006.01) |

(52) U.S. Cl.
CPC ............... *F02K 1/36* (2013.01); *F02C 7/18* (2013.01); *F01D 15/10* (2013.01); *F02C 7/32* (2013.01); *F02K 1/38* (2013.01); *F05D 2220/32* (2013.01); *F05D 2220/76* (2013.01); *F05D 2260/201* (2013.01)

(58) Field of Classification Search
CPC ....... F01D 25/30–305; F02K 1/04–085; F02K 1/28–386; F02K 1/46–50; F02K 1/822; F02K 9/972; F02C 7/18
See application file for complete search history.

(56) References Cited

U.S. PATENT DOCUMENTS

| | | | |
|---|---|---|---|
| 4,055,041 A | 10/1977 | Adamson et al. | |
| 5,154,052 A * | 10/1992 | Giffin, III | F02K 1/62 60/262 |
| 5,435,127 A * | 7/1995 | Luffy | F02K 1/1223 60/262 |

(Continued)

FOREIGN PATENT DOCUMENTS

| | | |
|---|---|---|
| EP | 2708701 | 3/2014 |
| EP | 3553295 | 10/2019 |

(Continued)

OTHER PUBLICATIONS

European Patent Office, European Search Report dated Jun. 4, 2021 in Application No. 21154864.9.

(Continued)

*Primary Examiner* — Stephanie Sebasco Cheng
(74) *Attorney, Agent, or Firm* — Snell & Wilmer L.L.P.

(57) ABSTRACT

An ejector assembly for a cooling system of a gas turbine engine may comprise: a tail cone having a tail cone outlet in fluid communication with a cooling air flow of the cooling system; an ejector body defining a mixing section, a constant area section, and a diffuser section; and a nozzle section in fluid communication with an exhaust air flow of the gas turbine engine, the ejector assembly configured to entrain the cooling air flow via the exhaust air flow.

11 Claims, 7 Drawing Sheets

(56) References Cited

U.S. PATENT DOCUMENTS

| | | | | |
|---|---|---|---|---|
| 6,895,756 | B2* | 5/2005 | Schmotolocha | F23R 3/22 60/749 |
| 6,931,856 | B2 | 8/2005 | Belokon et al. | |
| 7,134,271 | B2* | 11/2006 | Baughman | F02K 3/077 60/228 |
| 7,383,685 | B2 | 6/2008 | Means | |
| 8,487,500 | B2 | 7/2013 | Cullen et al. | |
| 9,003,811 | B2* | 4/2015 | Barnett | F01D 15/10 248/554 |
| 9,097,134 | B2 | 8/2015 | Ferch et al. | |
| 9,148,040 | B2 | 9/2015 | Anthony | |
| 9,239,029 | B2* | 1/2016 | Herrmann | F02K 1/34 |
| 9,644,538 | B2 | 5/2017 | Dionne | |
| 9,879,600 | B2 | 1/2018 | Stovall | |
| 9,917,490 | B2 | 3/2018 | Lemmers et al. | |
| 9,958,160 | B2* | 5/2018 | Dierberger | F23R 3/002 |
| 10,308,366 | B2 | 6/2019 | Kupiszewski et al. | |
| 10,422,282 | B2 | 9/2019 | Williams | |
| 11,047,306 | B1 | 6/2021 | Millhaem | |
| 2005/0091963 | A1* | 5/2005 | Li | F02K 1/36 60/39.5 |
| 2013/0284420 | A1 | 10/2013 | Stovall et al. | |
| 2014/0252769 | A1 | 9/2014 | Menheere et al. | |
| 2014/0321981 | A1 | 10/2014 | Rodriguez et al. | |
| 2016/0149469 | A1 | 5/2016 | Lemmers et al. | |
| 2016/0258358 | A1 | 9/2016 | Kazlauskas et al. | |
| 2017/0184025 | A1 | 6/2017 | Sawyers-Abbott | |
| 2018/0050806 | A1 | 2/2018 | Kupiszewski et al. | |
| 2018/0051701 | A1 | 2/2018 | Kupiszewski et al. | |
| 2018/0051702 | A1 | 2/2018 | Kupiszewski et al. | |
| 2018/0051716 | A1 | 2/2018 | Cheung et al. | |
| 2018/0283197 | A1 | 10/2018 | Jackowski et al. | |
| 2019/0085715 | A1 | 3/2019 | van der Merwe | |
| 2021/0018008 | A1 | 1/2021 | Muldoon | |
| 2021/0108568 | A1 | 4/2021 | Caimano | |
| 2021/0324799 | A1* | 10/2021 | Suzuki | B64D 41/00 |
| 2022/0045573 | A1* | 2/2022 | Seki | H02K 7/1823 |

FOREIGN PATENT DOCUMENTS

| | | | | |
|---|---|---|---|---|
| GB | 865838 A | * | 4/1961 | F02K 1/36 |
| JP | 2001078344 | | 3/2001 | |
| JP | 2004076703 | | 3/2004 | |
| WO | 2021014667 | | 1/2021 | |

OTHER PUBLICATIONS

United Kingdom Intellectual Property Office, United Kingdom Preliminary Report dated Sep. 1, 2021 in Application No. GB2112187.6.

USPTO, Non-Final Office Action dated Oct. 18, 2021 in U.S. Appl. No. 16/511,135.

USPTO, Restriction/Election Requirement dated Nov. 17, 2021 in U.S. Appl. No. 16/782,650.

United Kingdom Intellectual Property Office, United Kingdom Search Report dated Dec. 23, 2021 in Application No. GB2112187.6.

European Patent Office, European Office Action dated Jan. 4, 2022 in Application No. 21184728.0.

USPTO, Final Office Action dated Mar. 18, 2022 in U.S. Appl. No. 16/511,135.

USPTO, Non-Final Office Action dated Mar. 15, 2022 in U.S. Appl. No. 16/782,650.

European Patent Office, European Partial Search Report dated Mar. 2, 2021 in Application No. 20184955.1.

USPTO; Non-Final Office Action dated Jun. 17, 2022 in U.S. Appl. No. 17/081,627.

USPTO, Advisory Action dated Jun. 3, 2022 in U.S. Appl. No. 16/511,135.

European Patent Office; Extended European Search Report dated Apr. 28, 2022 in Application No. 21184728.0.

USPTO, Non-Final Office Action dated Sep. 8, 2022 in U.S. Appl. No. 16/782,650.

USPTO, Advisory Action dated Sep. 22, 2022 in U.S. Appl. No. 16/782,650.

USPTO, Notice of Allowance dated Nov. 4, 2022 in U.S. Appl. No. 17/081,627.

USPTO, Non-Final Office Action dated Nov. 30, 2022 in U.S. Appl. No. 16/782,650.

* cited by examiner

FIG. 6

TAIL CONE EJECTOR FOR POWER CABLE COOLING SYSTEM IN A GAS TURBINE ENGINE

GOVERNMENT LICENSE RIGHTS

This invention was made with Government support under Contract 80AFRC19C0015 awarded by the United States NASA. The Government has certain rights in this invention.

FIELD

The present disclosure relates to gas turbine engines, and, more specifically, to cooling systems for conductive cables in gas turbine engines.

BACKGROUND

A turbofan engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section.

Electric power for the engine is typically provided by a motor/generator driven through a tower shaft driven by a main engine shaft. Motor/generators and electric motors are typically stand-alone devices that are coupled to an external accessory gearbox. Alternate motor/generator and motor configurations and placements may provide increased engine efficiencies and accommodate increasing demands for electric power.

SUMMARY

An ejector assembly for a cooling system of a gas turbine engine is disclosed herein. The ejector assembly may comprise: a tail cone having a tail cone outlet in fluid communication with a cooling air flow of the cooling system; an ejector body defining a mixing section, a constant area section, and a diffuser section; and a nozzle section in fluid communication with an exhaust air flow of the gas turbine engine, the ejector assembly configured to entrain the cooling air flow via the exhaust air flow.

In various embodiments, the nozzle section is defined by a nozzle portion of the ejector body and the tail cone. The ejector body may further comprise a scoop defining an inlet to the nozzle section. A throat of the nozzle section is disposed forward of the tail cone outlet. The cooling air flow may be from an external air source disposed radially outward from a bypass air flow path of the gas turbine engine. The tail cone may comprise a scoop configured to divert the exhaust air flow of the gas turbine engine internal to the tail cone. The tail cone may further comprise a channel extending through the tail cone and in fluid communication with the exhaust air flow, the channel defining a throat at a nozzle portion of the channel. A cooling air flow path may be defined radially outward from the channel and between the channel and the ejector body. The ejector body may be coupled to the tail cone at the tail cone outlet. A cooling assembly may include the ejector assembly, the electric motor disposed in the tail cone, a conduit in fluid communication with the electric motor and the ejector assembly, and a plurality of conductive cables extending through the conduit and coupled to the electric motor. The cooling air flow may be configured to cool the plurality of conductive cables.

A method of exhausting a cooling air flow from a tail cone of a gas turbine engine is disclosed herein. The method may comprise: diverting an exhaust air flow from the gas turbine engine; choking the exhaust air flow forward of an outlet of the tail cone; and entraining the cooling air flow from the outlet of the tail cone.

In various embodiments, the exhaust air flow is disposed radially outward of the cooling air flow. Entraining the cooling air flow may further comprise pulling the cooling air flow through the outlet of the tail cone. The exhaust air flow may be diverted via a scoop proximate a nozzle of the gas turbine engine. The method may further comprise flowing the cooling air flow over a plurality of conductive power cables prior to entraining the cooling air flow. The method may further comprise pulling the cooling air flow from an external source prior to flowing the cooling air flow over the plurality of conductive power cables.

A cooling system of a gas turbine engine is disclosed herein. The cooling system may comprise: a tail cone having a tail cone outlet; an electric motor disposed in the tail cone; a conduit; a plurality of cables extending from the electric motor, the plurality of cables disposed at least partially in the conduit; a cooling source in fluid communication with the conduit, the cooling source configured to flow a cooling air flow through the conduit to cool the plurality of cables; and an ejector body coupled to the tail cone, the ejector body configured to entrain the cooling air flow through the tail cone outlet.

In various embodiments, the ejector body has a nozzle section defining a choke area between the tail cone and the ejector body. The cooling source may include an electric fan. The conduit may be in fluid communication with the electric fan. The tail cone may comprise a scoop configured to divert a portion of an exhaust air flow from the gas turbine engine, the exhaust air flow configured to entrain the cooling air flow.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface cross hatching lines may be used throughout the figures to denote different parts but not necessarily to denote the same or different materials.

Throughout the present disclosure, like reference numbers denote like elements. Accordingly, elements with like element numbering may be shown in the figures, but may not necessarily be repeated herein for the sake of clarity. Surface shading lines and/or cross-hatching may be used throughout the figures to denote different parts but not necessarily to denote the same or different materials.

Aft includes the direction associated with the tail (e.g., the back end) of an aircraft, or generally, to the direction of exhaust of a gas turbine engine. Forward includes the direction associated with the intake (e.g., the front end) of a gas turbine engine.

A first component that is "radially outward" of a second component means that the first component is positioned at a greater distance away from a central longitudinal axis of the gas turbine engine. A first component that is "radially inward" of a second component means that the first component is positioned closer to the engine central longitudinal axis than the second component. The terminology "radially outward" and "radially inward" may also be used relative to references other than the engine central longitudinal axis.

Figure 1A:
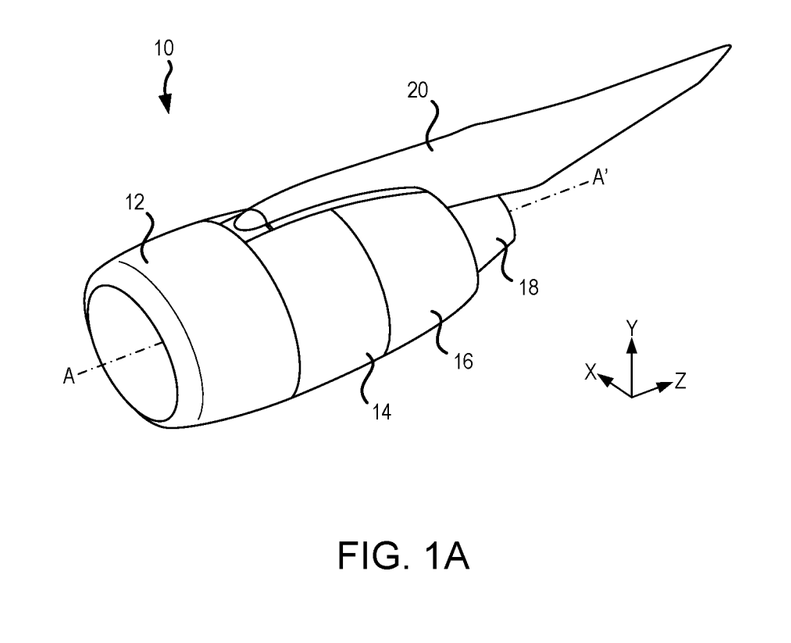
FIG. 1A illustrates a nacelle for a gas turbine engine, in accordance with various embodiments.

With reference to FIG. 1A, a nacelle 10 for a gas turbine engine is illustrated according to various embodiments. Nacelle 10 may comprise an inlet 12, a fan cowl 14, and a thrust reverser 16. Nacelle 10 may be coupled to a pylon 20. Pylon 20 may mount nacelle 10, and a gas turbine engine located within nacelle 10, to an aircraft wing or aircraft body. In various embodiments, an exhaust system 18 may extend from the gas turbine engine mounted within nacelle 10.

Figure 1B:
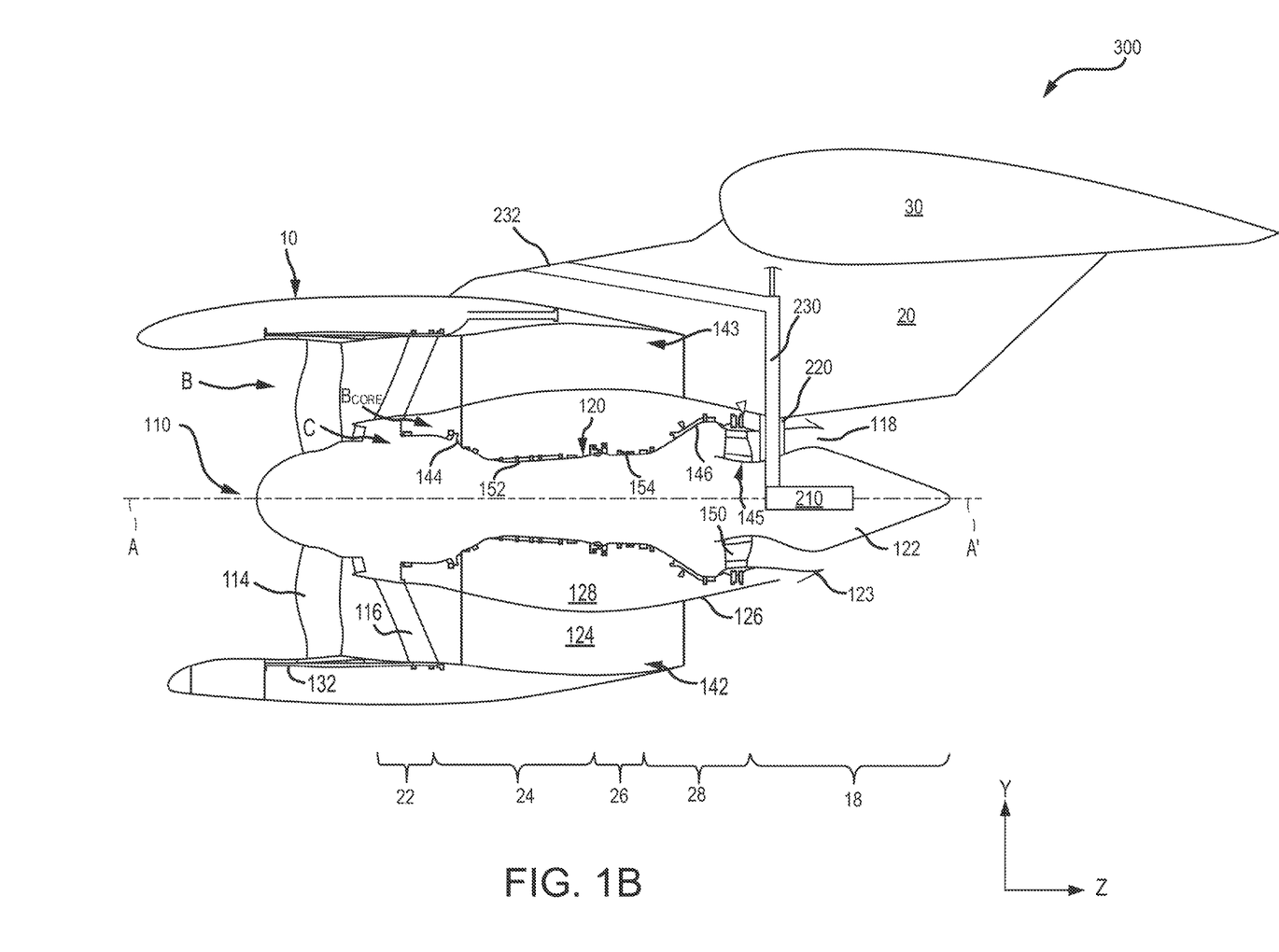
FIG. 1B illustrates a cross-sectional view of a gas turbine engine having a fluid injection system, in accordance with various embodiments.

FIG. 1B illustrates a cross-sectional view of a gas turbine engine 110 located within nacelle 10, in accordance with various embodiments. Gas turbine engine 110 may include a core engine 120. Core engine 120 may include an inlet section 22, a compressor section 24, a combustor section 26, and a turbine section 28. In operation, a fan 114 drives fluid (e.g., air) along a bypass flow-path B while compressor section 24 can drive air along a core flow-path C for compression and communication into combustor section 26 then expansion through turbine section 28. In various embodiments, core engine 120 generally comprises a low speed spool and a high speed spool mounted for rotation about an engine central longitudinal axis A-A'. Low speed spool may generally comprise a shaft that interconnects fan 114, a low pressure compressor 144, and a low pressure turbine 146. The high speed spool may comprise a shaft that interconnects a high pressure compressor 152 and high pressure turbine 154. A combustor may be located between high pressure compressor 152 and high pressure turbine 154. As used herein, a "high pressure" compressor or turbine experiences a higher pressure than a corresponding "low pressure" compressor or turbine. Although depicted gas turbine engine 110 is illustrated as a turbofan engine herein, it should be understood that the concepts described herein are not limited in use to turbofans as the teachings may be applied to other types of engines including turboprop and turboshaft engines. Although core engine 120 may be depicted as a two-spool architecture herein, it should be understood that the concepts described herein are not limited in use to two-spool gas turbine engines as the teachings may be applied to other types of engines including engines having more than or less than two spools.

Core engine 120 drives fan 114 of gas turbine engine 110. The air flow in core flow path C may be compressed by low pressure compressor 144 then high pressure compressor 152, mixed and burned with fuel in the combustor section 26, then expanded through high pressure turbine 154 and low pressure turbine 146. Turbines 146, 154 rotationally drive their respective low speed spool and high speed spool in response to the expansion. Bypass air flow B, driven by fan 114, flows in the aft direction through bypass flow path 124. At least a portion of bypass flow path 124 may be defined by nacelle 10 and an inner fixed structure (IFS) 126.

An upper bifurcation 143 and a lower bifurcation 142 may extend radially between the nacelle 10 and IFS 126 in locations opposite one another. Engine components such as wires and fluids, for example, may be accommodated in upper bifurcation 143 and lower bifurcation 142. IFS 126 surrounds core engine 120 and provides core compartment 128. Various components may be provided in core compartment 128 such as fluid conduits and/or compressed air ducts. For example, a portion $B_{CORE}$ of bypass air flow B may flow between core engine 120 and IFS 126 in core compartment 128. A fan case 132 may surround fan 114. Fan case 132 may be housed within nacelle 10. Fan case 132 may provide a mounting structure for securing gas turbine engine 110 to pylon 20, with momentary reference to FIG. 1A. According to various embodiments, one or more fan exit guide vanes 116 may extend radially between core engine 120 and fan case 132.

Exhaust system 18 is located aft of turbine section 28. Core air flow C flows through core engine 120 and is expelled through an exhaust outlet 118 of exhaust system 18. Exhaust outlet 118 may comprise an aerodynamic tail cone 122. A primary nozzle 123 may be located radially outward of tail cone 122. Primary nozzle 123 and tail cone 122 may define exhaust outlet 118. Exhaust outlet 118 provides an exhaust path for core air flow C exiting turbine section 28 of core engine 120. A secondary nozzle may be located radially outward of primary nozzle 123. Primary nozzle 123 and the secondary nozzle may define an exit flow path for bypass air flow B exiting core compartment 128 and/or bypass flow path 124. A plurality of turbine exit guide vanes (TEGVs) 150 may be located circumferentially about engine central longitudinal axis A-A' and proximate an aft end 145 of low pressure turbine 146.

In various embodiments, an electric motor 210 is disposed in tail cone 122. The electric motor 210 may be mechanically coupled to a low speed spool in core engine 120. Electric motor 210 may comprise an electric generator, an electric motor, a combination of the two, or the like. Electric motor 210 may be electrically coupled to a juncture box, or any other electrical device known in the art. The electrical device may be disposed radially outward from IFS 126 of gas turbine engine 110 in a wing 30 of an aircraft, in the pylon 20 of the aircraft, or the like. Conductive cables may extend from the electric motor 210 to the electric device external to gas turbine engine 110. The conductive cables (e.g., copper wires or the like) may extend radially outward from electric motor 210 through a strut 220, through the pylon 20 and to an electrical device in the wing 30, or any other location external or internal to IFS 126. The strut 220 extends from the tail cone 122 beyond the IFS 126. The strut may be disposed aft of the aft end 145 of low pressure compressor turbine 146 and forward of exhaust outlet 118. Due to the conductive cables proximity to exhaust outlet 118, the conductive cables may experience relatively high temperatures from air flow in core air flow path C.

In various embodiments, the conductive cables may be disposed in a conduit 230 extending radially outward from tail cone 122 through strut 220 and into the pylon 20. The conduit 230 may be fluidly coupled to an external air source by any method known in the art, such as a scoop, a vent, or the like. The external air source 232 may be disposed radially outward from nacelle 10. In this regard, the external air source 232 may receive colder temperature air relative to bypass air flow B. Although external air source 232 is illustrated forward of the electric motor 210 on the pylon, the application is not limited in this regard. For example, in various embodiments, the external air source 232 may be aft of the electric motor 210.

In various embodiments, bleed air from the core air flow path C may be diverted aft of the fan as a cooling source. However, bleed air may increase the mass flow and/or reduce efficiency of gas turbine engine 110. To address this, ambient air may be pulled from external to gas turbine engine 110, which may reduce or eliminate utilizing bleed air for the cooling of conductive power cables. In various embodiments, bypass air from bypass air flow path B may be diverted to act as a cooling source for cooling of conductive cables. However, bypass air may be limited to use while the gas turbine engine 110 is in operation. In this regard, bypass air may provide insufficient cooling after engine shutdown, or the like.

Figure 2:
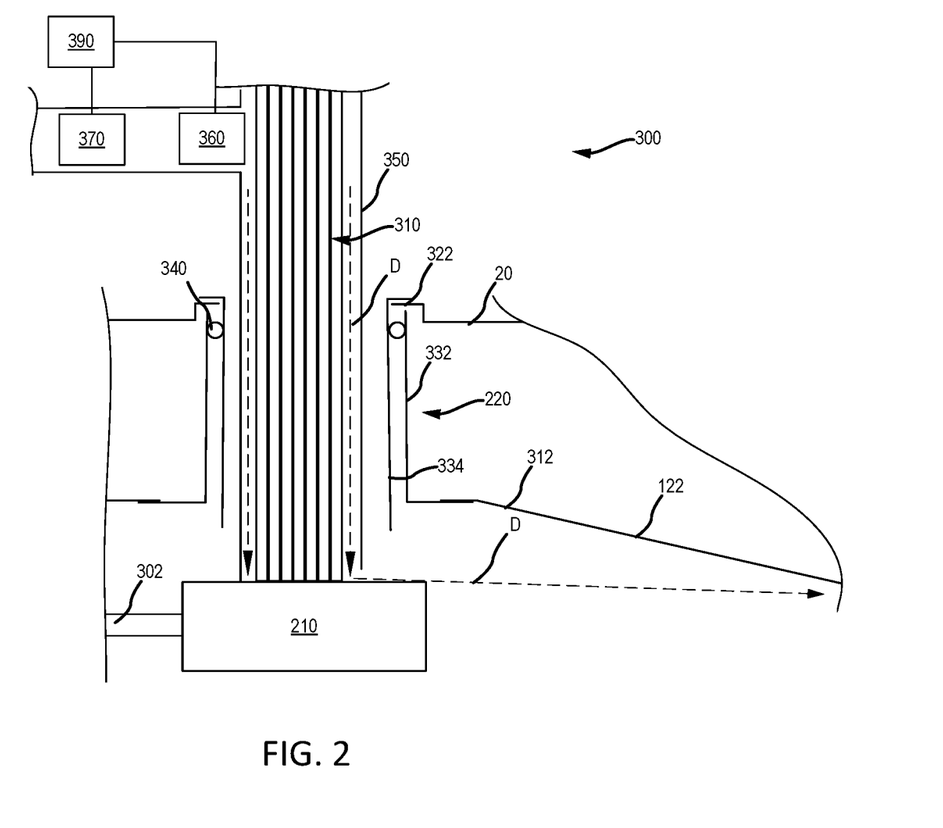
FIG. 2 illustrates a schematic view of cooling system of a gas turbine engine, in accordance with various embodiments.

Referring now to FIG. 2, and with combined reference to FIG. 1B, a schematic view of a conductive cable cooling system 300 of the gas turbine engine 110, in accordance with various embodiments, is illustrated. The conductive cable cooling system 300 comprises a plurality of conductive cables 310. The conductive cables 310 are extending from an electric motor 210 disposed in a tail cone 122. The electric motor 210 is operably coupled to a low speed spool 302 of a gas turbine engine (e.g., gas turbine engine 110 from FIG. 1B). The conductive cable cooling system 300 further comprises a strut 220 extending from a radially outer surface 312 of tail cone 122 to a radially inner surface 322 of pylon 20. The strut 220 may comprise an outer strut shell 332 and an inner strut shell 334. The outer strut shell 332 may be exposed to air flow from core air flow path C in FIG. 1B during operation of the gas turbine engine 110. The conductive cable cooling system 300 may further comprise an air seal 340 disposed between inner strut shell 334 and outer strut shell 332. In this regard, the air seal 340 may ensure that the plurality of conductive cables 310 are sealed from air from core air flow path C In various embodiments, the conductive cable cooling system 300 further comprises a conduit 350. The conduit 350 may be configured to house the plurality of conductive cables 310 through strut 220. The conduit 350 may be flexible or rigid. The conduit 350 may comprise a woven fiberglass sleeve, or the like. The conduit 350 may protect the plurality of conductive cables 310 from contacting strut 220 during operation of the gas turbine engine 110 from FIG. 1. The conduit 350 may further provide a cooling passageway for cooling air to flow from the external air source 232 from FIG. 1.

In various embodiments, the conductive cable cooling system 300 further comprises an electric fan 360 in fluid communication with the conduit 350 and a vent 370. The electric fan 360 may be configured to actively cool the plurality of conductive cables 310. The vent 370 may be configured to open or close. The electric fan 360 may be configured to receive cooling air flow from ambient air (e.g., an external air source from the nacelle, such as external air source 232). The electric fan 360 and the vent 370 may be electrically coupled to a processor 390. In various embodiments, processor 390 may be in electrical communication with electric fan 360. The processor 390 may be configured to activate, increase, or decrease a speed of the electric fan in response to various operation conditions of the gas turbine engine. Similarly, the vent 370 may be modulated in response to changes in various operation conditions of gas turbine engine. The processor 390 may be configured to detect an engine shutdown. In response to the engine shutdown, processor 390 may command vent 370 to open and command the electric fan to activate and begin rotating. In various embodiments, vent 370 may already be open at engine shutdown, and the processor may command the electric fan to increase a rotation speed or begin to rotate. In various embodiments, vent 370 may be commanded to operate between open and closed during operation in response to a desired air flow desired in conduit 350. Although the electric fan 360 and the vent 370 are illustrated as being forward of the electric motor 210, the disclosure is not limited int his regard. For example, in various embodiments, the electric fan 360 and the vent 370 are disposed aft of the electric motor 210.

The vent 370 may assume a closed configuration, an open configuration (100% open), and/or a partially open configuration (ranging between the open configuration and the closed configuration) as commanded by a controller. In various embodiments, the closed configuration may comprise the vent 370 being approximately 0% percent open (e.g., between 0% and 2% open), which may be set at any desired percent open. For the sake of simplicity, in this disclosure, the minimum percent open for the closed configuration is 0% open but in some embodiments may also be different values (e.g., 5% or other small openings that may allow passage of small amounts of air). In various embodiments, the vent actuator may cause the vent 370 to become more open or less open, at any time before, during, or after operation of the gas turbine engine 110 from FIG. 1B to assume the open configuration, a partially open configuration, and/or the closed configuration.

In various embodiments, processor 390 may be integrated into computer systems onboard an aircraft, such as, for example, a full authority digital engine control (FADEC), an engine-indicating and crew-alerting system (EICAS), and/or the like. Processor 390 may include one or more processors and/or one or more tangible, non-transitory memories and be capable of implementing logic. Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof.

In various embodiments, processor 390 may comprise a processor configured to implement various logical operations in response to execution of instructions, for example, instructions stored on a non-transitory, tangible, computer-readable medium. As used herein, the term "non-transitory" is to be understood to remove only propagating transitory signals per se from the claim scope and does not relinquish rights to all standard computer-readable media that are not only propagating transitory signals per se.

In various embodiments, processor 390 may be configured to control conductive cable cooling system 300. For example, processor 390 may be configured to transfer a control signal to electric fan to actively control cooling of the plurality of conductive cables 310. Processor 390 may generate and transmit the control signal based on an input received from FADEC or an electronic engine control in response to gas turbine engine shutting down. In this regard, conductive cable cooling system 300 may allow for active cooling of the plurality of conductive cables 310 after engine shutdown. The excitation control signal may further comprise electronic instructions configured to cause the electric fan 360 to rotate and provide cooling air in response to a temperature in conduit 350 exceeding a predetermined threshold. For example, a temperature sensor may be disposed in conduit 350 in electrical communication with the processor 390. In response to the temperature sensor detecting a conduit temperature above a threshold level, electric fan 360 may be active. In various embodiments, processor 390 may be configured to transmit a control signal to rotate electric fan 360 during operation of gas turbine engine 110 from FIG. 1. In this regard, electric fan 360 may drive air from external air source 232 (e.g., ambient air). The external air source 232 may provide colder air relative to bypass air flow, core air flow or the like and/or provide better cooling to the plurality of conductive cables than typical cable cooling systems.

In various embodiments, the cooling air provided by electric fan 360 may travel along cooling path D through the pylon 20 and strut 220 into the tail cone 122 and exit out a tail cone ejector disposed at an aft end of tail cone 122 as described further herein.

Figure 3:
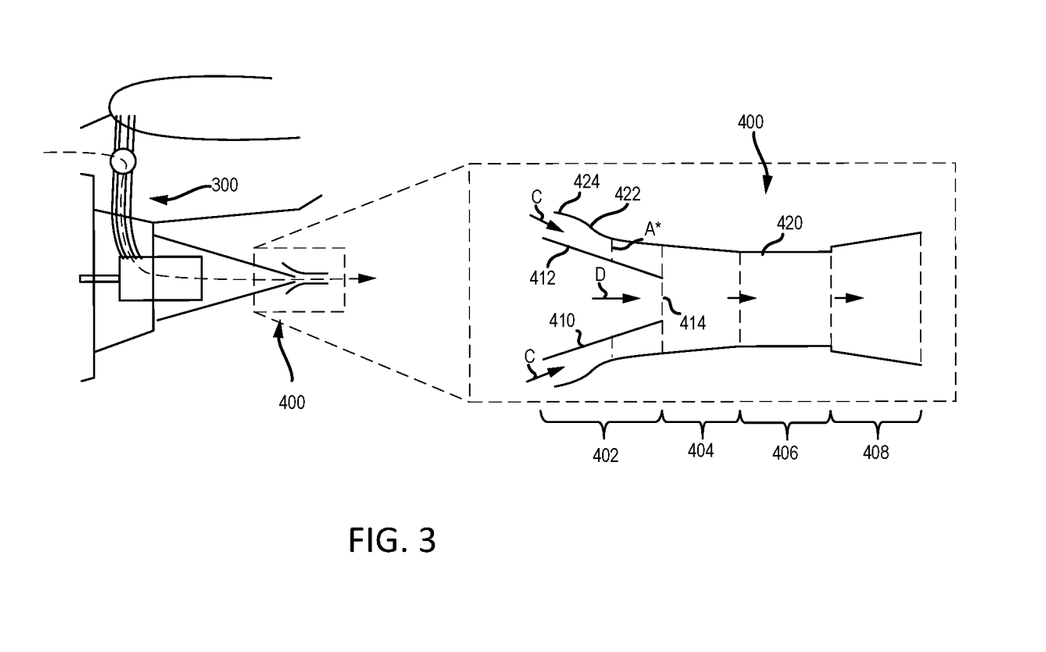
FIG. 3 illustrates a schematic view of an ejector assembly for use in a cooling system of a gas turbine engine, in accordance with various embodiments.

Referring now to FIG. 3, a schematic view of a tail cone ejector assembly 400 for use in a conductive cable cooling system 300, in accordance with various embodiments, is illustrated. Tail cone ejector assembly 400 may include a nozzle section 402, a mixing section 404, a constant area section 406, and a diffuser section 408. In various embodiments, the ejector assembly 400 comprises a tail cone 410 and an ejector body 420. The tail cone 410 may be a part of tail cone 122 from FIGS. 1B and 2. In operation, an entrained flow may travel through a flow path defined by a wall 412 of a tail cone 410 and a primary flow may travel between the wall 412 and a nozzle portion 422 of an ejector body 420. The nozzle portion 422 may be a portion of the ejector body within the nozzle section 402 of the tail cone ejector assembly 400. The wall 412 may further define cooling path D, and the wall 412 and the nozzle portion 422 of the ejector body 420 may further define core-flow path C. Fluid (e.g., air) is driven through core-flow path C as described previously herein, which is configured to entrain cooling flow along cooling flow path D. For example, a drop in pressure of the fluid traveling along core-flow path C caused by an increase in velocity after the flow along core-flow path C is choked at the choke area (e.g., the throat A*) pulls in (e.g., entrains) the cooling air flow through the cooling flow path D. The choke area is a constriction area along core-flow path C and may be a minimum constriction area. By choking the flow at the choke area, the velocity of the air flow traveling along core-flow path C increases aft of the choke area. Although described herein as an ejector assembly with choked flow resulting in a sonic exit velocity, the present disclosure is not limited in this regard. For example, a tail cone ejector assembly 400 may include a non-choked ejector without a choke area (e.g., throat A*) resulting in a subsonic exit velocity of the ejector assembly.

In various embodiments, the electric fan 360 from FIG. 2 may be sized and configured to actively cool the conductive cables 310 after an engine shutdown when an airplane having the gas turbine engine is on the ground. During operation of the gas turbine engine, the electric fan 360 may not provide enough pressure to eject air out the tail cone 410 on its own. For example, without the ejector assembly 400, air traveling along cooling flow path D may be subject to reverse. In various embodiments, by having an ejector assembly 400 a size of the electric fan 360 from FIG. 2 may be reduced as the air traveling along the core flow path C of the ejector assembly 400 may entrain the cooling air traveling along cooling flow path D in the mixing section 404 of the ejector assembly 400.

In various embodiments, the ejector body 420 further comprises a scoop 424 disposed at a forward end of the ejector body 420. The scoop 424 is configured to scoop exhaust flow from the gas-turbine engine into the outer annulus defined by the wall 412 of the tail cone 410 and the ejector body 420 where the exhaust flow acts as the primary air flow of the ejector assembly 400. In various embodiments, the tail cone 410 further comprises a tail cone outlet 414 disposed aft of the scoop 424 of the ejector body 420. The tail cone outlet 414 is also aft of the throat A* of the ejector assembly 400 and adjacent to the mixing section 404 of the ejector assembly.

In various embodiments, the ejector assembly 400 may be referred to as a critical or a non-critical ejector assembly. In various embodiments, a critical ejector assembly means that the ejector assembly is designed to accommodate fluid velocity along the core flow path C prior to the throat A* that is sonic, whereas a non-critical ejector assembly means ejector assembly that is designed to accommodate a fluid velocity along the core flow path C prior to the throat A* as being subsonic. In various embodiments, when the ejector assembly 400 is a critical design, the ejector assembly 400 may be sensitive to operating conditions other than those for which the ejector assembly 400 is designed. With a critical ejector assembly, it is possible to decrease the motivating pressure (e.g., the air flow through core flow path C) without a resulting change in the suction pressure if the discharge pressure is also decreased. The relation of change between the motivating pressure and the discharge pressure depends on the characteristics of the design of the ejector assembly 400. Since an ejector may have an optimal design point for a certain throat profile, once the ejector assembly 400 is designed and built to definite specifications of motivating pressure, discharge pressure and suction pressure, suction capacity of the ejector assembly 400 does not increase without changing the internal physical dimensions of the ejector assembly 400. The suction capacity may actually be lowered by increasing the motivating pressure. Since the nozzle portion 422 of the ejector body 420 is a fixed orifice metering device any change in the motivating pressure is accompanied by a proportionate change in the quantity of motive fluid.

In various embodiments, when the ejector assembly 400 is a non-critical design, changes in the motivating pressure and discharge pressure cause gradual changes in the suction pressure and capacity. Suction capacity does not increase in proportion to motivating pressure increases.

Figure 4:
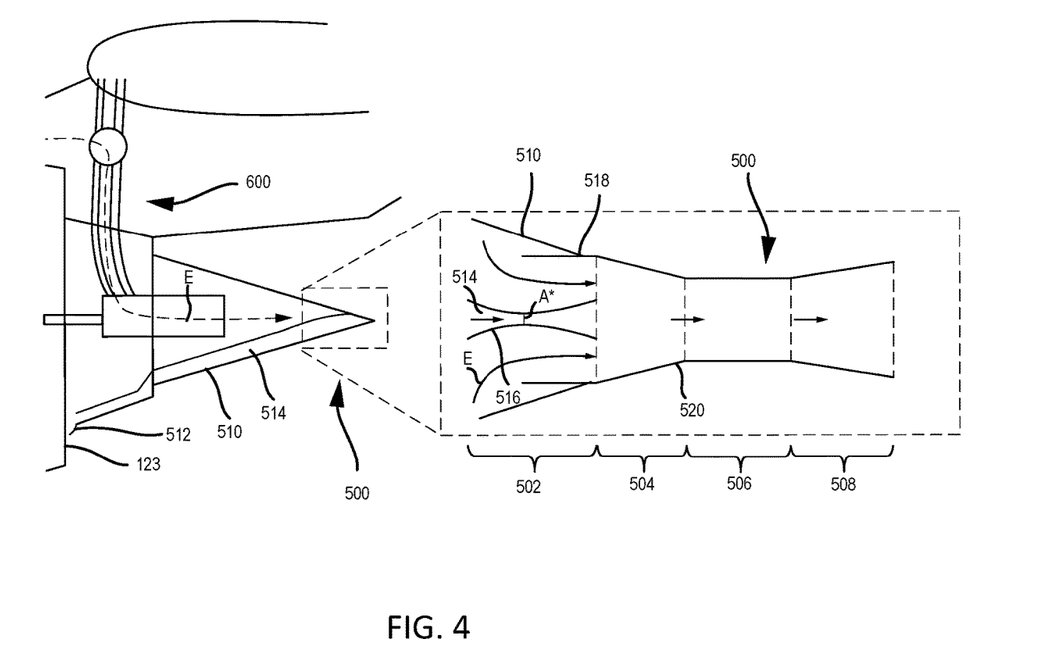
FIG. 4 illustrates a schematic view of an ejector assembly for use in a cooling system of a gas turbine engine, in accordance with various embodiments.

Referring now to FIG. 4, a schematic view of a tail cone ejector assembly 500 for use in a conductive cable cooling system 600, in accordance with various embodiments, is illustrated. In various embodiments, the conductive cable cooling system 600 is in accordance with the conductive cable cooling system 300 except as further described herein. In various embodiments, the tail cone 510 comprises a scoop 512 proximate primary nozzle 123. In this regard, the scoop 512 may be configured to direct a portion of exhaust flow from core flow path C from FIG. 1B internal to the tail cone 510 along a channel 514.

In various embodiments, the channel 514 is in fluid communication with an ejector body 520 of the ejector assembly 500. For example, the channel 514 may direct exhaust air from core flow path C through the choke area (e.g., throat A*), and entrain cooling flow traveling along cooling flow path E. In various embodiments, the cooling flow path E may be radially outward from the channel 514. Similar to ejector assembly 400 from FIG. 3, ejector assembly 500 comprises a nozzle section 502, a mixing section 504, a constant area section 506, and a diffuser section 508. The nozzle section 502 includes a nozzle portion 516 of the ejector assembly 500. In various embodiments, the cooling flow path E is disposed between the nozzle portion 516 and the ejector body 520. In various embodiments, the cooling flow path E is the secondary flow path, and the channel 514 defines the primary flow path. In various embodiments, an ejector assembly in accordance with ejector assembly 500 may be more complicated from a manufacturing standpoint for a tail cone ejector relative to an ejector assembly in accordance with the ejector assembly 400. However, an ejector assembly in accordance with ejector assembly 500 may be slightly more efficient relative to an ejector assembly in accordance with ejector assembly 400 from FIG. 3.

In various embodiments, the ejector body 520 may be coupled to the tail cone 510 proximate a tail cone outlet 518. In various embodiments, the channel 514 may be a fluid conduit disposed within the tail cone 510. In various embodiments, the ejector body 520 and the tail cone 510 may be a monolithic component. In various embodiments, the ejector body 520 and the tail cone may be distinct components.

Figure 5:
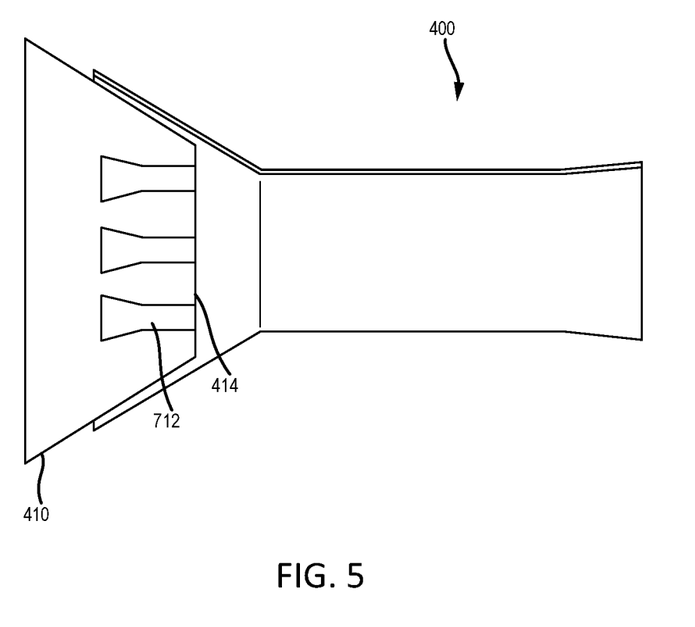
FIG. 5 illustrates a schematic view of an ejector assembly for use in a cooling system of a gas turbine engine, in accordance with various embodiments.

Referring now to FIG. 5, the tail cone ejector assembly 400 in accordance with various embodiments, is illustrated. In various embodiments, the ejector assembly 400 further comprises a motive fluid inlet scoop 712. Although illustrated as comprising three motive fluid inlet scoops, the ejector assembly 400 is not limited in this regard. For example, the ejector assembly 400 may include any number of motive fluid inlet scoops (e.g., one single inlet scoop that sweeps a circumference of less than 360 degrees that is non-axisymmetric, a plurality of motive inlet scoops disposed symmetrically proximate the tail cone outlet 414 of the tail cone 410, or a plurality of asymmetric motive inlet scoops disposed proximate the tail cone outlet 414). In various embodiments, the motive fluid inlet scoop 712 may provide a lip height that is larger to avoid clogging of the ejector assembly 400.

Figure 6:
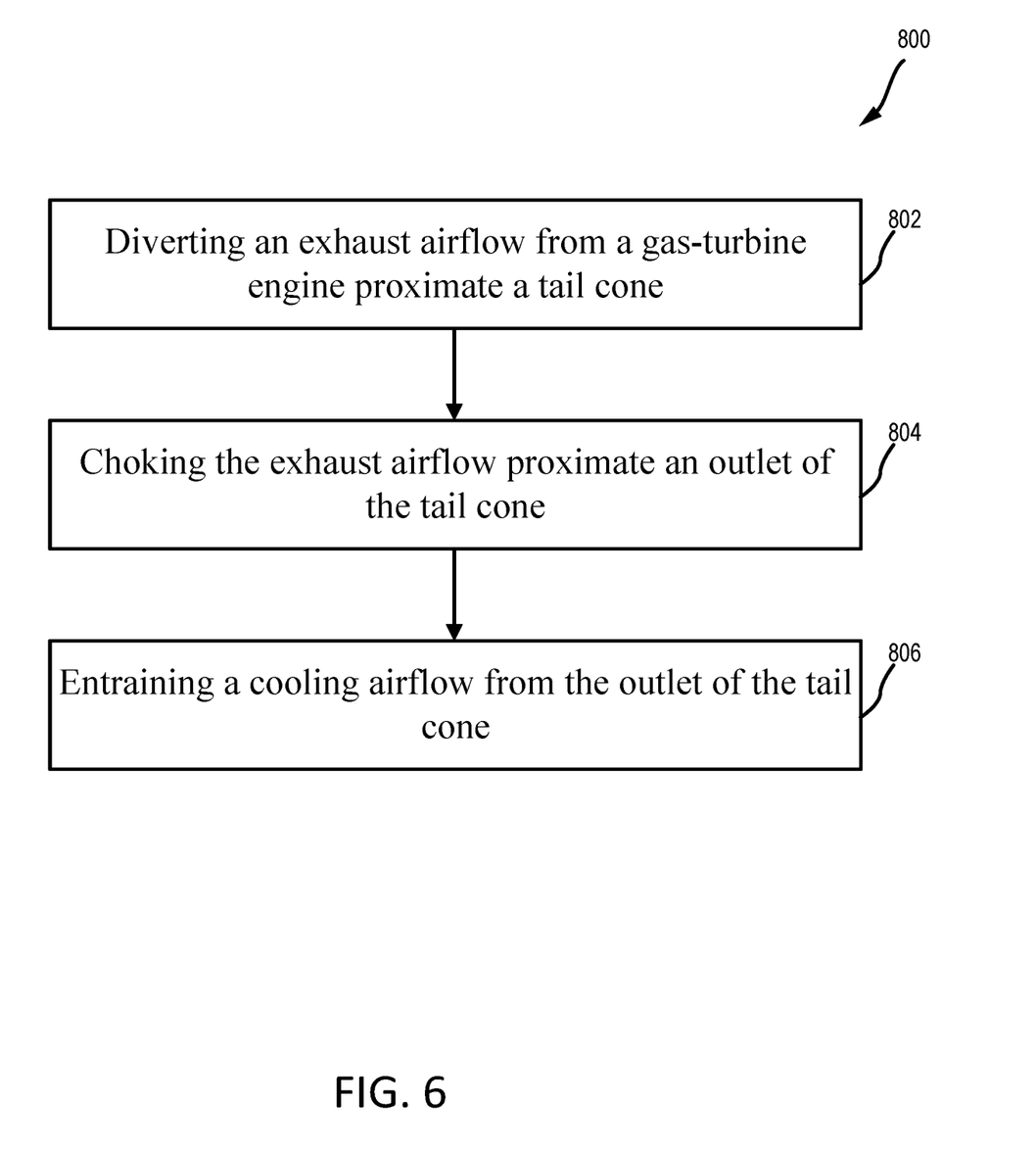
FIG. 6 illustrates a method of entraining a cooling air flow from a tail cone of a gas turbine engine.

Referring now to FIG. 6, a method 800 of using a tail cone ejector assembly (e.g., tail cone ejector assembly 400, 500), in accordance with various embodiments, is illustrated. In various embodiments, the method 800 comprises diverting an exhaust air flow from a gas turbine engine proximate a tail cone (step 802). The exhaust air flow may be diverted by a scoop, such as scoop 512 from FIG. 4 or scoop 424 from FIG. 3. The exhaust air flow may be diverted internal to the tail cone, as illustrated in FIG. 4, or between the tail cone and an ejector body as illustrated in FIG. 3.

In various embodiments, the method 800 further comprises choking the exhaust air flow proximate an outlet of the tail cone (step 804). In various embodiments, the exhaust air flow may be subsonic prior to being choked and sonic after being choked. In various embodiments, the exhaust air flow is choked forward of a tail cone outlet. In various embodiments, the method 800 further comprises entraining a cooling air flow from the outlet of the tail cone (step 806). The cooling air flow may be an air flow of a conductive power cable cooling system. For example, the cooling air flow may be an air flow that is pulled from an external air source from ambient air through a conduit and internal to the tail cone. In various embodiments, the cooling air flow may be pulled out the outlet of the tail cone in response entraining the cooling air flow.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A gas turbine engine, comprising:
    an ejector assembly comprising:
        a tail cone having a tail cone outlet in fluid communication with a cooling air flow of a cooling system, and
        an ejector body defining a mixing section, a constant area section downstream of the mixing section, and a diffuser section downstream of the constant area section,
        wherein a nozzle section of the ejector assembly is defined by the tail cone and the ejector body, the nozzle section being in fluid communication with a portion of a core airflow of the gas turbine engine and defining a choked flow area radially between the tail cone and the ejector body, the ejector assembly configured to entrain the cooling air flow via the portion of the core airflow,
    an electric motor disposed in the tail cone;
    a conduit in fluid communication with the electric motor;
    a plurality of conductive cables extending through the conduit and coupled to the electric motor; and
    a primary nozzle disposed radially outward from the ejector assembly, the primary nozzle defining an exhaust outlet upstream of the ejector body for a remainder of the core airflow of the gas turbine engine.

2. The gas turbine engine of claim 1, wherein the ejector body further comprises a scoop defining an inlet to the nozzle section.

3. The gas turbine engine of claim 1, wherein a throat of the nozzle section is disposed forward of the tail cone outlet.

4. The gas turbine engine of claim 1, wherein the cooling air flow is from an external air source disposed radially outward from a bypass air flow path of the gas turbine engine.

5. The gas turbine engine of claim 1, wherein the cooling air flow is configured to cool the plurality of conductive cables.

6. A cooling system of a gas turbine engine, the cooling system comprising:
    a tail cone having a tail cone outlet;
    an electric motor disposed in the tail cone;
    a conduit;
    a plurality of cables extending from the electric motor, the plurality of cables disposed at least partially in the conduit;
    a cooling source in fluid communication with the conduit, the cooling source configured to flow a cooling air flow through the conduit to cool the plurality of cables; and
    an ejector body coupled to the tail cone and defining a mixing section, a constant area section downstream of the mixing section, and a diffuser section downstream of the constant area section, the ejector body configured to entrain the cooling air flow through the tail cone outlet via a portion of a core airflow of the gas turbine engine,
    wherein a nozzle section is defined by the tail cone and the ejector body, the nozzle section being in fluid communication with the portion of the core airflow and defining a choked flow area radially between the tail cone and the ejector body; and
    a primary nozzle disposed radially outward from the ejector body, the primary nozzle defining an exhaust outlet upstream of the ejector body for a remainder of the core airflow of the gas turbine engine.

7. The cooling system of claim 6, wherein the cooling source includes an electric fan.

8. The cooling system of claim 7, wherein the conduit is in fluid communication with the electric fan.

9. The cooling system of claim 6, wherein the tail cone comprises a scoop configured to divert the portion of core airflow configured to entrain the cooling air flow.

10. The gas turbine engine of claim 1, further comprising a cooling source in fluid communication with the conduit.

11. The gas turbine engine of claim 10, wherein the cooling source is configured to flow the cooling air flow through the conduit to cool the plurality of conductive cables.

* * * * *